Sept. 12, 1961  E. A. GALLO ET AL  2,999,354
VARIABLE AREA NOZZLE

Filed July 18, 1956  3 Sheets-Sheet 1

INVENTORS
ELIA A. GALLO
WILLIAM F. PAYNE
BY
ATTORNEY

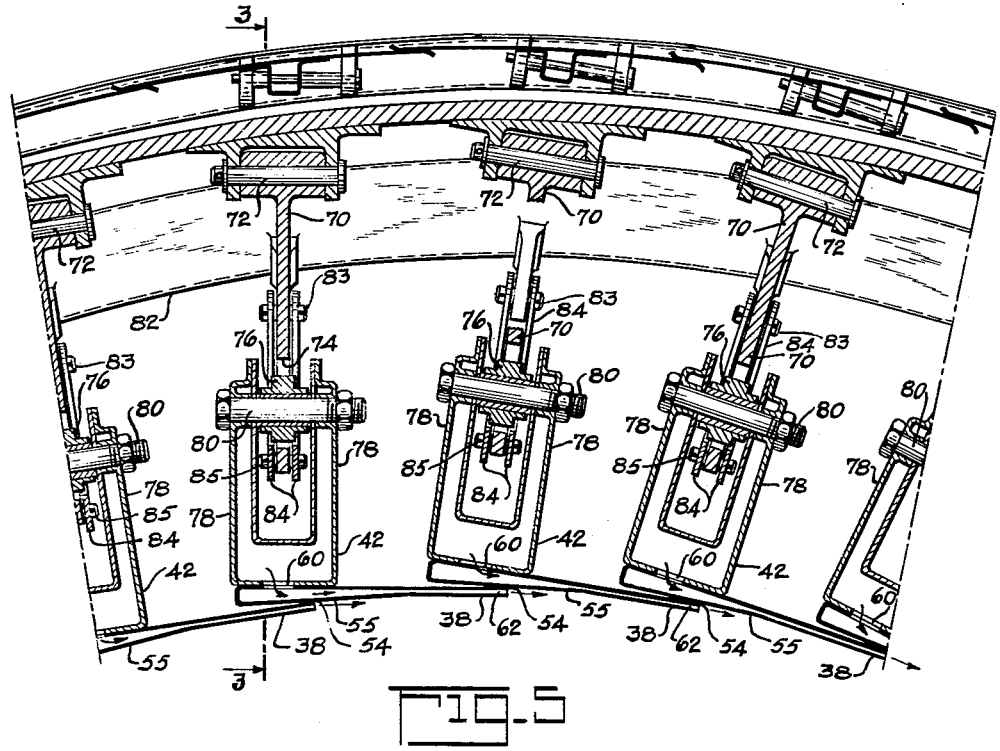

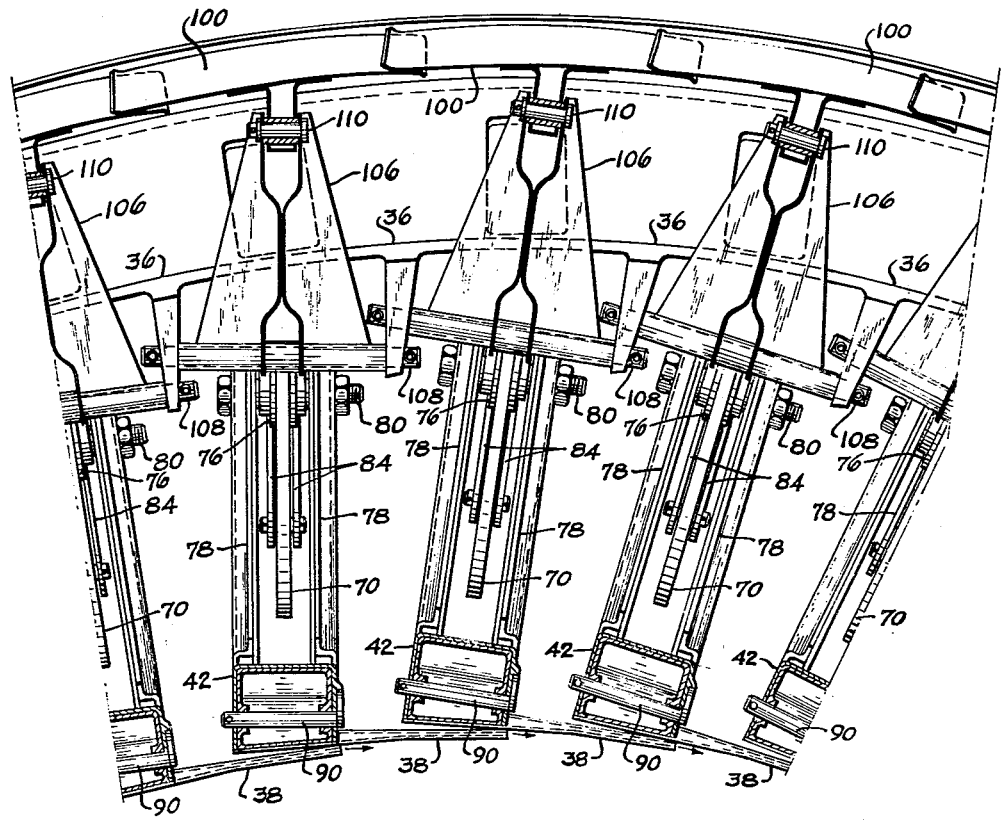
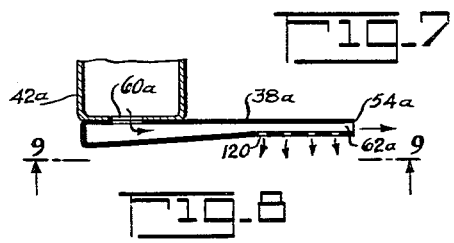
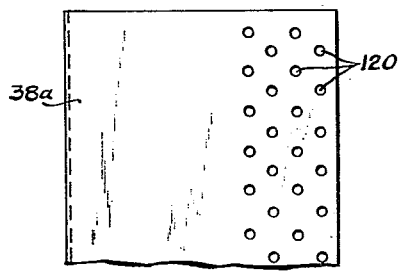
INVENTORS
ELIA A. GALLO
WILLIAM F. PAYNE
BY
ATTORNEY

United States Patent Office 2,999,354
Patented Sept. 12, 1961

2,999,354
VARIABLE AREA NOZZLE
Elia A. Gallo, Englewood, and William F. Payne, Cedar Grove, N.J., assignors to Curtiss-Wright Corporation, a corporation of Delaware
Filed July 18, 1956, Ser. No. 598,612
14 Claims. (Cl. 60—35.6)

This invention relates to variable area nozzles and is particularly directed to a variable area nozzle for aircraft jet engines.

It is known to construct circular variable area nozzles for aircraft jet engines by providing a plurality of hinged members which can be pivotally moved to vary the nozzle area, said members circumferentially overlapping each other.

An object of the invention comprises the provision of a novel construction of such a nozzle in which the nozzle members are disposed in overlapping sealed relation and have the strength to withstand the internal nozzle pressures as well as some flexibility to absorb nozzle distortions while the nozzle members remained sealed. A further object of the invention comprises such an overlapping nozzle construction in which means are provided to cause cooling air to flow over both the inner and outer surfaces of each said overlapping nozzle member.

Another object of the present invention comprises the provision of such a novel nozzle construction in which the nozzle exit area can be varied independently of the throat area. A still further object of the invention comprises the provision of such a construction in which both the nozzle throat and nozzle exit areas can be varied over a large area ratio.

It is known to provide a fairing or shroud construction, comprising a plurality of overlapping members, disposed about and connected to the nozzle members so that the downstream end of said shroud members move inwardly with closing adjustment of said nozzle members. A further object of the invention comprises a novel construction of such a nozzle such that a large change in the nozzle exit area is accompanied by only a relatively small change in the downstream area of the shroud whereby the shroud is a smooth continuation of the adjacent aircraft surface in all positions of nozzle adjustment and at the same time the base drag area of the engine is reduced with closing adjustment of the nozzle.

Other objects of the invention will become apparent upon reading the annexed detailed description in connection with the drawing in which.

Figure 3:
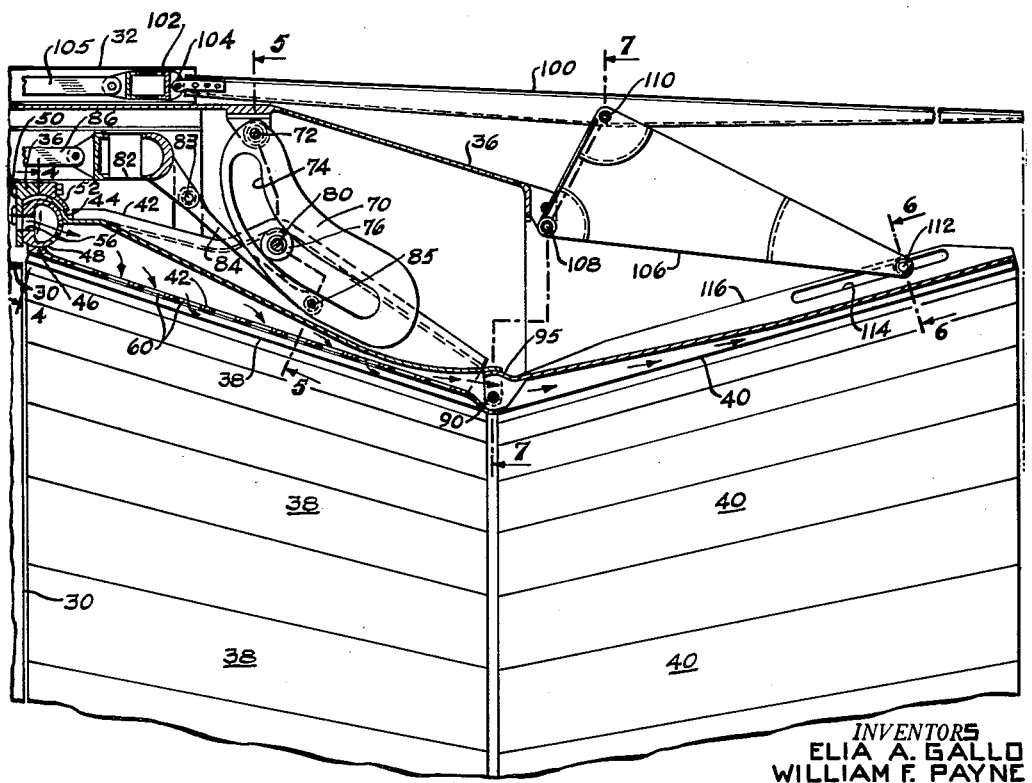
FIG. 3 is an axial sectional view of a convergent-divergent nozzle and shroud combination embodying the invention.

FIGS. 4, 5, 6 and 7 are sectional views taken along lines 4—4, 5—5, 6—6 and 7—7 respectively of FIG. 3; and FIGS. 8 and 9 are views illustrating a modified nozzle member construction.

Figures 1, 2:
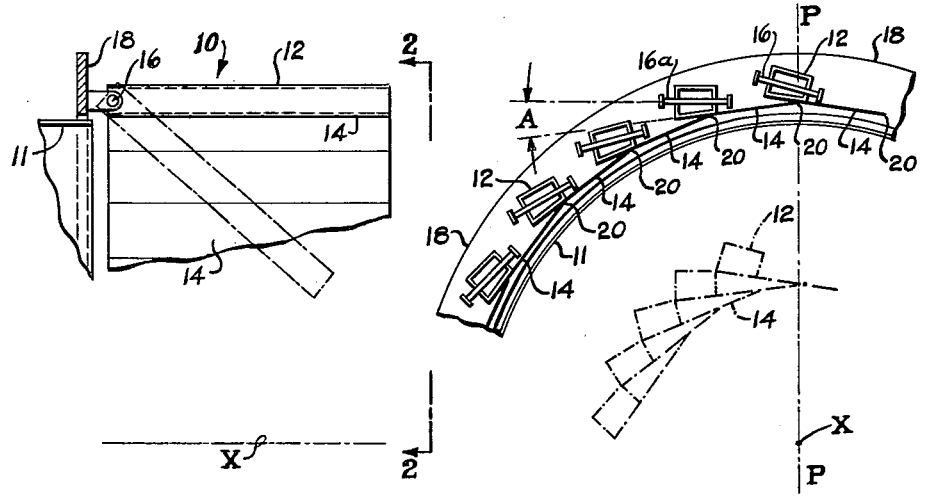
FIG. 1 is a diagrammatic axial sectional view of an adjustable nozzle for the purpose of illustrating an arrangement of pivotally mounted circumferentially overlapping nozzle members embodying the invention.
FIG. 2 is an end view taken along line 2—2 of FIG. 1.

Referring first to FIGS. 1 and 2 of the drawing, a nozzle 10 mounted at the downstream end of a jet engine exhaust duct 11 is illustrated as comprising a plurality of nozzle segments symmetrically disposed about the nozzle axis X and each including a supporting beam 12 and a flat plate-like member 14 carried by said beam. Each nozzle member supporting beam 12 is pivotally connected at its upstream end by pivot pins 16 to an annular support ring 18. Each supporting beam 12 is secured to its associated flat nozzle member 14 on the external side of said member and adjacent to one longitudinal edge of said member. The other longitudinal edge 20 of each flat nozzle member circumferentially overlaps and contacts the inner surface of the adjacent nozzle member, this latter longitudinal edge being a straight edge which is co-planar with the nozzle axis X of the nozzle. The pivot pin 16 of each nozzle member has its axis disposed perpendicular to the plane defined by the longitudinal edge 20 of its associated nozzle member and the nozzle axis. To illustrate this, in FIG. 2 one of the pivot pins 16 has been designated 16a for identification and this latter pivot pin is perpendicular to a plane P—P defined by the nozzle axis X and the straight overlapping edge 20 of the nozzle member 14 supported by said pin. This construction results in the angle A between the axis of each pivot pin 16 and the flat surfaces of its associated nozzle member 14, as measured in a plane perpendicular to the nozzle axis X, being equal to 360° divided by twice the number of nozzle members 14.

With this construction of FIGS. 1 and 2 and assuming that each flat plate member 14 has no appreciable thickness it can readily be shown, from geometrical considerations, that as long as all the nozzle members 14 are symmetrically positioned about the axes of their respective pivot pins 16 the longitudinal edge 20 of each nozzle member 14 will maintain line contact with its adjacent nozzle member 14 in all positions of adjustment about their pivot pins 16. In any actual construction the nozzle members 14 will have some thickness. The same result is obtained, however, as long as the portion of the inner surface of a nozzle member 14 contacted by an adjacent nozzle member is flat and is co-planar with its straight edge 20 contacting the other adjacent nozzle member. This line contact of each nozzle member on the adjacent member exists throughout the range of adjustment. The amount of overlap of the nozzle members 14, however, increases as the nozzle members are adjusted inwardly, for example to the dot and dash line position illustrated, to reduce the nozzle area. As shown in FIG. 2 by the dot-and-dash line position of the nozzle members 14, the minimum nozzle area is limited only by physical interference of the supporting beams 12.

The nozzle construction of FIGS. 1 and 2 provides a nozzle which can withstand high internal pressures and at the same time the overlapping portions of the nozzle members 14 can be made sufficiently flexible so as to maintain a leakage tight contact between adjacent nozzle members notwithstanding some distortions of said nozzle members. Since the flat plate-like nozzle members 14 extend circumferentially to one side of their supporting beams 12 they have some flexibility at their overlapping edges 20. Because of this flexibility, these nozzle members will bend to accommodate for distortions and/or interference because of manufacturing tolerances. Also because of this flexibility of the nozzle members 20, the gas pressure within the nozzle against the nozzle members makes them self sealing against each other.

No means for adjusting the nozzle members 14 has been illustrated in FIGS. 1 and 2. As far as the novel arrangement of the nozzle members 14 in FIGS. 1 and 2 is concerned various means may be provided for adjusting these members. For example, these nozzle members may be adjusted in a manner similar to means provided for adjusting the upstream nozzle members in FIGS. 3–7.

FIGS. 3–7 show an extension of the invention of FIGS. 1 and 2 to a convergent-divergent nozzle having a shroud or fairing interconnected with the divergent nozzle portion so that adjustment of the nozzle exit area in an area increasing or decreasing direction results in a corresponding but smaller adjustment of the downstream area of said shroud or fairing.

In FIGS. 3-7 reference numeral 30 designates the downstream end of an exhaust duct for the hot exhaust gases of a jet engine, said duct being disposed within a housing 32. A convergent-divergent nozzle 34 is mounted at the discharge end of the duct 30 from a supporting structure 36 disposed between and connected to the duct 30 and housing 32. The nozzle 34 comprises a plurality of pairs of upstream and downstream nozzle members 38 and 40, respectively, disposed in end-to-end relation with the upstream nozzle members being symmetrically disposed in circumferentially overlapping relation and with the downstream nozzle members being similarly disposed. The upstream nozzle members 38 each have a supporting beam structure 42 secured thereto adjacent to one longitudinal edge and the upstream end of each supporting beam structure terminates in spaced cylindrical socket portions 44 and 46 journaled above a hollow pivot pin 48 secured to an annular flange 50 on the support structure 36 for pivotally supporting the nozzle members 38 from their upstream ends. Each pivot pin 48 has a bracket 52 associated therewith and mounted on the flange 50 with a cylindrical shelf spaced from its pivot pin 48 and within which space the cylindrical socket portion 44 of the associated upstream nozzle member is received.

The other longitudinal edge 54 of each nozzle member 38 circumferentially overlapping and contacting the adjacent nozzle member 38 is straight and co-planar with the axis of the nozzle and, as in FIGS. 1 and 2, the pivot axis provided by the pivot pin 48 of said nozzle member is perpendicular to said plane. This is illustrated in FIG. 4 where one of the pivot pins 48 has been designated 48a for identification and its axis its perpendicular to a plane R—R which includes the nozzle axis and the longitudinal edge 54 of the associated nozzle member 38.

Each nozzle member 38 has a hollow construction so that unlike the flat plate-like nozzle members 14 of FIGS. 1 and 2, each member 38 has a substantial thickness, as measured in a radial direction relative to the nozzle axis. The portion 55 of the inner surface of each nozzle member 38, contacted by the edge 54 of the adjacent nozzle member 38, is flat and co-planar with its longitudinal edge 54. With this construction of the nozzle members 38, the geometry of the arrangement is such that the longitudinal edge 54 of each nozzle member 38 maintains line seal contact with the adjacent nozzle member 38 in all positions of equal pivotal adjustment of said members. As in FIGS. 1 and 2, with this arrangement the angle between the pivot axis of each pin 48 and the flat surface portion 55 of its associated nozzle member 38, as measured in a plane perpendicular to the nozzle axis, is equal to 360° divided by twice the number of nozzle members 38.

The supporting beam 42 of each nozzle member 38 also has a hollow construction into which air or other cooling medium is supplied from the annular space between the exhaust duct 30 and the engine housing 32 through openings 56 in the annular support flange 50 and the associated pivot pin 48. This cooling air may be obtained from the air surrounding the aircraft jet engine or, in the case of an aircraft turbo-jet engine, this cooling air may be bled off from the engine air compressor. From each hollow supporting beam 42, the cooling air flows into the associated nozzle member 38 through openings 60. Each nozzle member 38 has an opening or openings 62 disposed along its longitudinal edge 54 so that the cooling air flows circumferentially through each nozzle member 38 and out through its open edge 54 to flow over the inner surface of the adjacent nozzle member 38. In this way each nozzle member 38 is cooled by air flow circumferentially therethrough as well as by air flow circumferentially over its inner surface.

For actuating the nozzle members 38 a plurality of lever members 70 are pivotally connected to the fixed support structure 36, there being one lever 70 for each nozzle member 38. Each lever 70 is pivotally connected to the support structure 36 by a pivot pin 72, the pivot axis of which is parallel to the pivot axis provided by the pivot pin 48. Each lever 70 has a cam track 74 rollably engaged by a cam follower roller 76 journaled on the supporting beam 42 of the associated nozzle member 38. For this purpose each supporting beam has a U-shaped section (as best seen in FIG. 5) having side portions 78 between which one end of the associated lever 70 is received. Each roller 76 is disposed between the side portions 78 of its beam 42 and is journaled on a pin 80 extending across and carried by said side portions. In addition, each lever 70 is interconnected with an axially movable ring 82 by a link 84 pivotally connected at one end to the ring 82 by a pivot pin 83 and at its other end to said lever 70 by a pivot pin 85. For this purpose each link 84 has a forked construction to straddle a portion of the lever 70 to which it is connected.

An actuating linkage 86 is connected to the ring 82 for axially moving said ring. Axial motion of the ring 82 is transmitted by the links 84 to the levers 70 which, through the cam rollers 76, are effective to simultaneously and equally adjust the positions of the nozzle members 38 about their respective pivot axes.

As previously stated the convergent-divergent nozzle 34 comprises a plurality of pairs of upstream and downstream members 38 and 40 respectively. Each pair of upstream and downstream nozzle members are pivotally connected together in end-to-end relation by a pivot pin 90 so that the nozzle throat is formed at the pivotal connection of said members. Each downstream nozzle member 40 has one longitudinal edge 92 circumferentially overlapping and having line contact with a flat portion 94 of the inner surface of an adjacent nozzle member 40. The longitudinal edge 92 of a downstream nozzle member 40 is a straight edge which is co-planar with the nozzle axis and with the straight edge 54 of its paired upstream nozzle member 38 and, as in the case of the upstream nozzle members, the pivot axis provided by the pivot pin 90 for said downstream nozzle member 40 is perpendicular to said plane. Also the longitudinal edge 92 of each nozzle member 40 and the flat inner surface portion of said nozzle member are co-planar. With this arrangement, the longitudinal edge 92 of each nozzle member 40 provides line seal contact with an adjacent nozzle member in all positions of adjustment of said nozzle members about their pivot pins 90. Also, as in the case of the nozzle members 38, the angle between the axis of each pivot pin 90 and the flat surface portion 94 of its associated nozzle member 40, as measured in a plane perpendicular to the nozzle axis, is equal to 360° divided by twice the number of nozzle members 40.

The nozzle members 40 each have a hollow construction and the upstream end of each member 40 has an overlapping interfitted construction 95 with the supporting beam 42 of the paired upstream member 38 at their connecting pivot pin 90 to provide for cooling air flow from the hollow beam 42 into said hollow nozzle member 40. Like the nozzle members 38, each hollow nozzle member 40 has an open construction along its longitudinal edge 92 for cooling air flow circumferentially therefrom over the inner surface of the adjacent nozzle member 40.

With the hollow construction and arrangement of the nozzle members 38 and 40, cooling air flows through these members and circumferentially therefrom through their open longitudinal edges 54 and 92 and thence over the inner surfaces of their adjacent nozzle members. In this way there is cooling air flow over the inner nozzle surface at the junctions of the overlapping nozzle members 38 and 40. Hence if any leakage of gases should take place outwardly between the overlapping nozzle members it will be cooling air rather than hot exhaust gases. This feature is quite important from the standpoint of keeping the nozzle members cool.

A shroud comprising a plurality of equally-spaced circumferentially-overlapping members 100 is co-axially disposed about the nozzle 34, there being one such shroud member 100 for each pair of nozzle members 38 and 40. Each shroud member 100 is pivotally connected at its upstream end to an axially movable ring 102 by a pivot pin 104. Linkage means 105 is connected to the ring 102 for axially moving said ring. Each shroud member 100 is connected to its associated downstream nozzle member 40 by a triangular-shaped lever 106. Each lever 106 is pivotally connected at one end to the fixed structure 36 by a pivot pin 108, is pivotally connected intermediate its ends to its associated shroud member 100 by a pivot pin 110 and is pivotally connected at its other end to its associated downstream nozzle member 40 by a pivot pin 112 slidingly received in a longitudinally extending slot 114 formed in a reinforcing flange or beam 116 secured to said nozzle member adjacent its longitudinal edge opposite to its longitudinal edge 92.

At this point it should be noted that for each pair of nozzle members 38 and 40 and their associated shroud member 100, the pivot axes provided by the pivot pins 48, 72, 80, 83, 85, 90, 104, 108, 110 and 112 are all parallel to each other.

With the foregoing construction of FIGS. 3-7, the throat area of the nozzle can be adjusted by axial adjustment of the movable ring 82. Thus as the ring 82 is moved to the right (FIG. 3) this motion is transmitted to the cam levers 70 to adjust equally the nozzle members 38 in a direction to increase the throat area of the nozzle. Likewise axial adjustment of the ring 102 is effective through the levers 106 to adjust the shroud members 100 and the downstream nozzle members 40 in the same direction. Thus as the ring 102 is moved to the right (FIG. 3) this motion is effective to move equally the downstream ends of the shroud members 100 inwardly to decrease the area of the downstream end of the shroud and at the same time the downstream ends of the nozzle members 40 are moved equally inward to decrease the nozzle exit area. The levers 106 are arranged so that the movement of the downstream ends of the nozzle members 40 is greater than the simultaneous movement of the downstream ends of the shroud members 100 so that the shroud members 100 always form a smooth continuation of the housing 32. It should be noted that this arrangement permits adjustment of the nozzle exit area independently of the nozzle throat area, that is without any change in the nozzle throat area.

The construction of FIGS. 3-7 provides relatively low stresses in the nozzle members 38 and 40 and their hinge points. Thus in the case of the nozzle members 38 the high loads are taken by the cam track 74 of each lever 70 which is located in the relatively cool zone between the nozzle 34 and shroud. This zone can be cooled by air flow therethrough. The shroud provided by the members 100 preferably extends downstream beyond the nozzle 34 so that the exhaust gases discharging from the nozzle function as an ejector to help draw cooling air through the zone between the shroud and nozzle.

In order to increase the cooling effect of the air flowing through the hollow nozzle members 38 and 40 fins (not shown) may be provided within and secured to the walls of said members.

In the construction of FIGS. 3-7, all the air protecting the inner surfaces of the nozzle members 38 and 40 from the hot exhaust gases discharging through the nozzle discharges from the open longitudinal edges 54 and 92 respectively of said nozzle members. In lieu of or in addition to the openings along the edges 54 and 92 openings may be provided over the inner surfaces of the nozzle members. Such a modification of the nozzle members 38 is illustrated in FIGS. 8-9. For convenience, the parts of FIGS. 8-9 have been designated by the same reference numerals as the corresponding parts of FIGS. 3-7 but with a subscript *a* added thereto.

In FIGS. 8-9, the nozzle members 38*a* are like the nozzle members 38 except a plurality of openings 120 are provided over the inner surface of each member 38*a*. With this arrangement cooling air not only discharges through the openings along the longitudinal edge 54*a* of each member 38*a* but said air also discharges through the openings 120 thereby insuring a distribution of cooling air over the entire inner surface of each nozzle member 38*a*. The openings 120 may be provided in each member 38*a* in addition to the openings along the longitudinal edge 54*a* of said member as illustrated in FIGS. 8-9 or said openings 120 may be provided in lieu of the openings along the longitudinal edge 54*a*. Obviously the nozzle members 40 may be similarly modified by providing openings over and through their inner surfaces. Also, instead of the openings 120 the inner wall of each hollow nozzle member 38*a* and/or 40*a* may have a porous construction to provide relatively smaller openings for the discharge of the cooling medium therethrough.

While we have described our invention in detail in its present preferred embodiment, it will be obvious to those skilled in the art, after understanding our invention that various changes and modifications may be made therein without departing from the spirit or scope thereof. We aim in the appended claims to cover all such modifications.

We claim as our invention:

1. A nozzle construction comprising a plurality of circumferentially-spaced nozzle members each having one longitudinal edge contacting and circumferentially overlapping a portion of the inner surface of the adjacent nozzle member so as to form a nozzle of substantially circular cross-section; means pivotally supporting the upstream ends of said nozzle members such that the pivot axis of each nozzle member is perpendicular to a plane including its said longitudinal edge and the axis of said nozzle.

2. A nozzle construction as recited in claim 1 in which said longitudinal edge of each nozzle member contacting the adjacent nozzle member is a straight line and at least the portion of each nozzle member contacted by the longitudinal edge of the adjacent nozzle member is a flat surface.

3. A nozzle construction as recited in claim 2 in which the angle between said flat surface portion of each nozzle member and the pivot axis of said member, in a plane perpendicular to the nozzle axis, is equal to 360 degrees divided by twice the number of said members.

4. A nozzle construction as recited in claim 2 in which said flat surface portion of each nozzle member and the longitudinal contacting edge of said nozzle member are co-planar.

5. A nozzle construction as recited in claim 1 in which each nozzle member has a longitudinally-extending supporting beam disposed adjacent to the other longitudinal edge of said member.

6. A nozzle construction comprising a plurality of circumferentially-spaced nozzle members each having one longitudinal edge contacting and circumferentially overlapping a portion of the inner surface of the adjacent nozzle member so as to form a nozzle of substantially circular cross-section, each of said nozzle members including its said overlapping longitudinal edge having a hollow construction such that both walls of its said hollow longitudinal edge are disposed radially inwardly of the inner wall of the nozzle member overlapped thereby, said nozzle members being hollow for the flow of a cooling medium therethrough and each said nozzle member having an open construction along its said longitudinal edge for outflow of said cooling medium circumferentially therefrom over the inner surface of the adjacent nozzle member, the other longitudinal edge of each nozzle member being closed.

7. A nozzle construction comprising a plurality of circumferentially-spaced nozzle members pivotally supported at their upstream ends for adjustment to vary the nozzle area, each of said nozzle members having one longitudinal edge contacting and circumferentially overlapping a portion of the inner surface of the adjacent nozzle member so as to form a nozzle of substantially circular cross-section and each of said nozzle members including its said overlapping longitudinal edge having a hollow construction such that both walls of its said hollow longitudinal edge are disposed radially inwardly of the inner wall of the nozzle member overlapped thereby, said nozzle members being hollow for the flow of a cooling medium therethrough with each nozzle member having an open construction along its said longitudinal edge for outflow of said cooling medium circumferentially therefrom over the inner surface of the adjacent nozzle member, the other longitudinal edge of each nozzle member being closed.

8. A convergent-divergent fluid nozzle comprising a plurality of pairs of nozzle members with each pair of nozzle members being pivotally connected in end-to-end relation to form upstream and downstream members and with the upstream nozzle member being pivotally supported at its upstream end, the upstream and downstream nozzle members being disposed to form the convergent and divergent portions respectively of the nozzle and each upstream nozzle member having one longitudinal edge circumferentially overlapping the adjacent upstream nozzle member to provide said upstream nozzle portion with a substantially circular cross-section and each downstream nozzle member having one longitudinal edge circumferentially overlapping the adjacent downstream nozzle member to provide said downstream nozzle portion with a substantially circular cross-section, said one longitudinal edge of each upstream nozzle member and said one longitudinal edge of its paired downstream nozzle member lying in a common plane with each other and with the nozzle axis, the pivot axis of the upstream nozzle member and the axis of the pivotal connection between said pair upstream and downstream nozzle members being perpendicular to said plane.

9. A convergent-divergent fluid nozzle comprising a plurality of pairs of nozzle members with each pair of nozzle members being pivotally connected in end-to-end relation to form upstream and downstream members and with the upstream nozzle member being pivotally supported at its upstream end, the upstream and downstream nozzle members being disposed to form the convergent and divergent portions respectively of the nozzle and each upstream nozzle member having one longitudinal edge circumferentially overlapping the adjacent upstream nozzle member to provide said upstream nozzle portion with a substantially circular cross-section and each downstream nozzle member having one longitudinal edge circumferentially overlapping the adjacent downstream nozzle member to provide said downstream nozzle portion with a substantially circular cross-section, each nozzle member including its said overlapping longitudinal edge having a hollow construction such that both walls of its said hollow longitudinal edge are disposed radially inwardly of the inner wall of the nozzle member overlapped thereby, said nozzle members being hollow for the flow of a cooling medium therethrough and each said nozzle member has an open construction along its said longitudinal edge for outflow of said cooling medium circumferentially therefrom over the inner surface of the adjacent nozzle member, the other longitudinal edge of each nozzle member being closed.

10. A convergent-divergent fluid nozzle comprising a plurality of pairs of nozzle members with each pair of nozzle members being pivotally connected in end-to-end relation to form upstream and downstream members and with the upstream nozzle members being pivotally supported at its upstream end, the upstream and downstream nozzle members being disposed to form the convergent and divergent portions respectively of the nozzle and each upstream nozzle member having one longitudinal edge circumferentially overlapping the adjacent upstream nozzle member to provide said upstream nozzle portion with a substantially circular cross-section and each downstream nozzle member having one longitudinal edge circumferentially overlapping the adjacent downstream nozzle member to provide said downstream nozzle portion with a substantially circular cross-section; a plurality of circumferentially overlapping shroud members, forming a substantially annular shroud about said nozzle; first axially movable annular means co-axial with the nozzle; means pivotally connecting the upstream end of each shroud member to said first annular means; means connecting said shroud members with the downstream nozzle members so that axial movement of said annular means results in adjustment of the downstream ends of said shroud members and of said downstream nozzle members to simultaneously adjust, in the same direction, the area of the downstream end of the shroud and the nozzle exit area; second axially movable annular means co-axial with the nozzle; and means interconnecting said second annular means with each of the upstream nozzle members so that axial movement of said second annular means results in adjustment of the downstream ends of said upstream nozzle members to adjust the nozzle throat area.

11. A convergent-divergent fluid nozzle and shroud combination comprising a plurality of pairs of nozzle members with each pair of nozzle members being pivotally connected in end-to-end relation to form upstream and downstream members and with the upstream member being pivotally supported at its upstream end, the upstream and downstream nozzle members being disposed to form the convergent and divergent portions respectively of the nozzle and each upstream nozzle member having one longitudinal edge circumferentially overlapping the adjacent upstream nozzle member to provide said upstream nozzle portion with a substantially circular cross-section and each downstream nozzle member having one longitudinal edge circumferentially overlapping the adjacent downstream nozzle member to provide said downstream nozzle portion with a substantially circular cross-section; a plurality of circumferentially overlapping shroud members forming a substantially annular shroud about said nozzle, there being one such shroud member for each of said pairs of nozzle members; first axially-movable annular means co-axial with the nozzle; means pivotally connecting the upstream end of each shroud member to said first annular means; first lever means pivotally interconnecting each shroud member with the downstream nozzle member of its associated pair of nozzle members so that axial movement of said annular means results in adjustment of the downstream ends of said shroud members and of said downstream nozzle members to simultaneously adjust, in the same direction, the nozzle exit area and the area of the downstream end of the shroud; second axially movable annular means co-axial with the nozzle; and second lever means interconnecting said second annular means with each of the upstream nozzle members so that axial movement of said second annular means results in adjustment of the downstream ends of said upstream nozzle members to adjust the nozzle throat area.

12. The combination recited in claim 11 in which said one longitudinal edge of each nozzle member of a pair of upstream and downstream nozzle members and the nozzle axis are co-planar and each pivot axis of said pair of nozzle members and each pivot axis of the associated shroud member and of the associated first and second lever means is perpendicular to said plane.

13. A combination convergent-divergent fluid nozzle and shroud combination comprising a plurality of pairs of nozzle members with each pair of nozzle members being disposed in end-to-end relation to form upstream and downstream members with their adjacent ends pivotally connected together and with the upstream nozzle member being pivotally supported at its upstream end, the upstream and downstream nozzle members being disposed to form the convergent and divergent portions respectively of the nozzle and each upstream nozzle member having one longitudinal edge circumferentially overlapping the adjacent upstream nozzle member to provide said upstream nozzle portion with a substantially circular cross-section and each downstream nozzle member having one longitudinal edge circumferentially overlapping the adjacent downstream nozzle member to provide said downstream nozzle portion with a substantially circular cross-section; a plurality of circumferentially overlapping shroud members forming a substantially annular shroud about said nozzle, there being one such shroud member for each of said end-to-end pairs of nozzle members; first axially movable annular means co-axial with said nozzle; means pivotally connecting the upstream end of each shroud member to said first annular means; a plurality of first levers, one for each shroud member and having a pivotal support at one end, each said lever having an intermediate portion pivotally connected to its associated shroud member and having its other end provided with a sliding pivotal connection with the adjacent downstream nozzle member so that axial movement of said annular means results in adjustment of the downstream ends of said shroud members and of said downstream nozzle members about the pivotal connections at the upstream ends of said members to simultaneously adjust, in the same direction, the downstream area of the shroud and the nozzle exit area; second axially movable annular means co-axial with said nozzle; a plurality of second levers, one for each upstream nozzle member and having a pivotal support at one end, each said second lever having a cam track; a plurality of cam follower rollers, one for each upstream nozzle member with each roller being journaled on its upstream nozzle member and rollably engaging the cam track of the associated second lever; a plurality of links, one for each of said second levers with one end of each link being pivotally connected to said second annular means and the other end of each link being connected to its associated second lever so that axial movement of said second annular means results in adjustment of the downstream ends of said upstream nozzle members about the pivotal support for said members to adjust the nozzle throat area.

14. The combination recited in claim 13 in which said one longitudinal edge of each nozzle member of a pair of upstream and downstream nozzle members and the nozzle axis are co-planar and each pivot axis of said pair of nozzle members, their associated levers, link and shroud member is perpendicular to said plane.

References Cited in the file of this patent

UNITED STATES PATENTS

| | | |
|---|---|---|
| 2,568,726 | Franz | Sept. 25, 1951 |
| 2,597,253 | Melchior | May 20, 1952 |
| 2,778,190 | Bush | Jan. 22, 1957 |
| 2,780,056 | Colley | Feb. 5, 1957 |

FOREIGN PATENTS

| | | |
|---|---|---|
| 165,224 | Australia | Sept. 15, 1955 |
| 162,716 | Austria | Apr. 11, 1949 |
| 1,088,984 | France | Sept. 22, 1954 |
| 1,124,336 | France | June 25, 1956 |
| 742,875 | Great Britain | Jan. 4, 1956 |